US 8,990,572 B2

(12) United States Patent
Patefield-Smith et al.

(10) Patent No.: US 8,990,572 B2
(45) Date of Patent: Mar. 24, 2015

(54) METHODS AND SYSTEMS FOR CONDUCTING SMART CARD TRANSACTIONS

(75) Inventors: Martin Patefield-Smith, Cheltenham (GB); James Ahern, Dunboyne (IE)

(73) Assignee: Daon Holdings Limited, George Town (KY)

( * ) Notice: Subject to any disclaimer, the term of this patent is extended or adjusted under 35 U.S.C. 154(b) by 224 days.

(21) Appl. No.: 13/454,130

(22) Filed: Apr. 24, 2012

(65) Prior Publication Data

US 2013/0281055 A1     Oct. 24, 2013

(51) Int. Cl.
| | | |
|---|---|---|
| *G06F 21/34* | (2013.01) | |
| *G06F 21/77* | (2013.01) | |
| *G06F 21/12* | (2013.01) | |
| *G06F 21/00* | (2013.01) | |
| G06Q 20/34 | (2012.01) | |
| H04L 9/32 | (2006.01) | |
| H04M 15/00 | (2006.01) | |

(52) U.S. Cl.
CPC .............. *G06F 21/123* (2013.01); *G06F 21/00* (2013.01); *G06Q 20/341* (2013.01); *H04L 9/32* (2013.01); *H04M 15/7556* (2013.01); *H04T 2001/113* (2013.01)
USPC ........................................................ 713/172

(58) Field of Classification Search
CPC ....... G06F 21/123; G06F 21/30; G06F 21/00; G06Q 20/341; H04L 9/32; H04M 15/7556; H04T 2001/133; H04T 2001/113
See application file for complete search history.

(56) References Cited

U.S. PATENT DOCUMENTS

| | | | | |
|---|---|---|---|---|
| 6,256,737 | B1 * | 7/2001 | Bianco et al. | 713/186 |
| 6,834,802 | B2 * | 12/2004 | Sukeda et al. | 235/451 |
| 7,293,717 | B1 * | 11/2007 | Pathmasuntharan et al. | 235/492 |
| 8,503,983 | B2 * | 8/2013 | Chen et al. | 455/411 |
| 2002/0080190 | A1 * | 6/2002 | Hamann et al. | 345/810 |
| 2004/0190038 | A1 * | 9/2004 | Shahindoust | 358/1.14 |
| 2005/0246292 | A1 | 11/2005 | Sarcanin | |
| 2005/0257058 | A1 * | 11/2005 | Yoshida et al. | 713/175 |
| 2008/0148393 | A1 * | 6/2008 | Wendt | 726/19 |
| 2009/0108064 | A1 | 4/2009 | Fernandes et al. | |
| 2009/0165125 | A1 * | 6/2009 | Brown et al. | 726/21 |
| 2009/0181662 | A1 * | 7/2009 | Fleischman et al. | 455/419 |
| 2010/0001064 | A1 * | 1/2010 | Goman et al. | 235/380 |
| 2011/0136471 | A1 * | 6/2011 | Chen et al. | 455/411 |
| 2011/0140841 | A1 * | 6/2011 | Bona et al. | 340/5.83 |

(Continued)

FOREIGN PATENT DOCUMENTS

| | | | | |
|---|---|---|---|---|
| GB | 2434661 | A * | 8/2007 | |
| GB | 2 457 221 | A | 8/2009 | |
| WO | WO 2008063028 | A1 * | 5/2008 | G06Q 30/00 |

OTHER PUBLICATIONS

Choi, Brian et al. "Cloud-based User Authentication with Geo-Temporal Queries on Smartphones," Dec. 2009, ACM, p. 19-26.*

(Continued)

*Primary Examiner* — Matthew Smithers
*Assistant Examiner* — Demaris Brown
(74) *Attorney, Agent, or Firm* — Kevin McDermott, Esq.

(57) ABSTRACT

A method for conducting smart card transactions is provided that includes causing a computer to recognize communications from a mobile device as communications from a smart card reader containing a smart card, and conducting a smart card transaction in accordance with smart card security techniques with the mobile device.

14 Claims, 5 Drawing Sheets

(56) References Cited

U.S. PATENT DOCUMENTS

2013/0074170 A1\* 3/2013 Lo et al. .............................. 726/7
2013/0226796 A1\* 8/2013 Jiang et al. ....................... 705/44
2013/0281014 A1\* 10/2013 Frankland et al. ........... 455/41.1

OTHER PUBLICATIONS

David et al., "Secure Identity Authentication and Logical Access Control for Airport Information Systems," 2003, IEEE, p. 314-320.\*
Idrissa, Abdourhamane et al., "Secure Protocols for Serverless Remote Product Authentication," Oct. 2010, ACM, p. 1-7.\*
Sanchez-Reillo et al, "Access Control System with Hand Geometry Verification and Smart Cards," 2000, IEEE, vol. 15 Issue 2, p. 45-48.\*
Madlmayr, G. et al., "Managing an NFC Ecosystem," Mobile Business, 2008. ICMB '08. 7th Int'l Conf. on, IEEE, pp. 95-101.
Geethapriya Venkataramani et al., Mobile phone based RFID architecture for secure electronic Payments using RFID credit cards,Availability, Reliability & Securitypp. 610-620.
Alex Varshavsky et al., "Amigo: Proximity-Based Authentication of Mobile Devices," UBICOMP 2007, Sep. 16, 2007.
Extended European Search Report for EPO Application No. 13164464.3 dated May 13, 2014, pp. 1-9.

\* cited by examiner

METHODS AND SYSTEMS FOR CONDUCTING SMART CARD TRANSACTIONS

BACKGROUND OF THE INVENTION

This invention relates generally to conducting smart card transactions, and more particularly, to methods and systems for conducting smart card transactions with mobile devices.

Individuals typically store confidential data on, and conduct confidential communications over the Internet through, computers. Imposters have been known to obtain access to such confidential data and communications by surreptitiously obtaining and using data for accessing the computer, and by eavesdropping on communications conducted by individuals over the Internet. To counter such imposter activities, individuals are typically required to successfully authenticate their identity through any one of various techniques prior to gaining access to a computer and its data. For example, smart card security techniques have been adopted by many companies and governmental agencies to protect sensitive data, information, and confidential communications against imposters.

Smart card security techniques generally involve fitting a computer or computer system with a smart card reader, or readers, that communicate with the computer and process data on a smart card to conduct smart card transactions. Smart card transactions typically include at least authenticating smart card holders, decrypting data, and creating digital signatures. Smart cards typically include security data of an authorized individual and are generally distributed to and used by individuals authorized to use a computer or computer system. As part of accessing the computer or computer system, authorized individuals are authenticated by inserting their smart card into the smart card reader which conducts an authentication transaction using the security data stored on the card and authentication data obtained from the individual. Upon successful authentication, the individual is permitted to access the computer or computer system.

However, producing, distributing, and installing smart card readers and smart cards have been known to be expensive. Moreover, imposters have been known to surreptitiously steal smart cards from authorized individuals and to use the stolen cards to obtain unauthorized access to confidential data, to eavesdrop on confidential communications, and to otherwise conduct fraudulent network-based transactions. Furthermore, malfunctioning or otherwise discarded smart card readers and smart cards have been known to constitute a source of non-biodegradable waste that may harm the environment.

BRIEF DESCRIPTION OF THE INVENTION

In one aspect, a method for conducting smart card transactions is provided. The method includes causing a computer to recognize communications from a mobile device as communications from a smart card reader containing a smart card, and conducting a smart card transaction in accordance with smart card security techniques with the mobile device.

In another aspect, a system for conducting smart card transactions is provided that includes a computer and at least one mobile device. The mobile device is configured to communicate with the computer such that the computer recognizes the at least one mobile device as a smart card reader containing a smart card.

In yet another aspect, a mobile device is configured to communicate with a computing device such that the computing device recognizes the mobile device as a smart card reader containing a smart card. The mobile device is a smart phone, a tablet computer, a laptop computer, or a personal digital assistant.

DETAILED DESCRIPTION OF THE INVENTION

Figure 1:
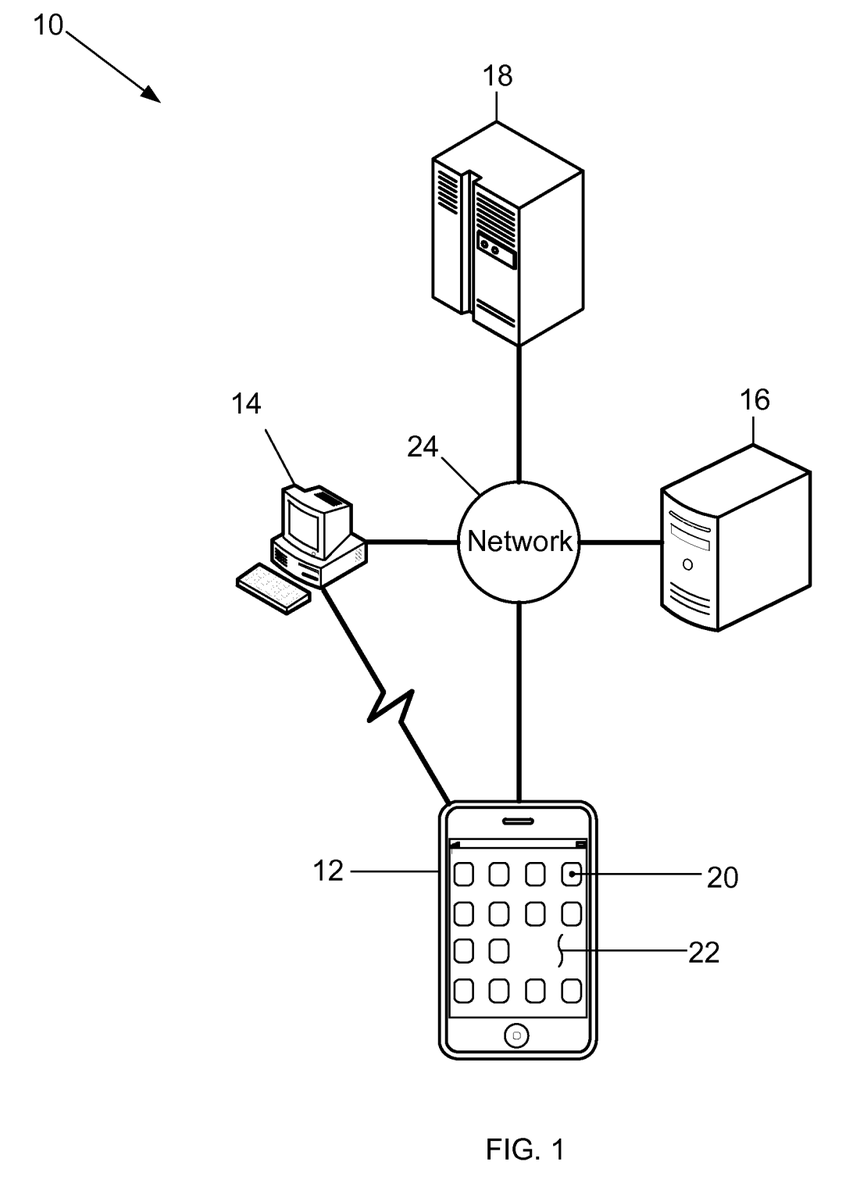
FIG. 1 is a block diagram of an exemplary embodiment of a security system for emulating operations conducted by smart cards, and by smart card readers containing smart cards, on a mobile device.

FIG. 1 is a diagram of an exemplary embodiment of a security system 10 for emulating operations conducted by smart cards, and by smart card readers containing smart cards, on a mobile device. More specifically, the security system 10 includes a mobile device 12, a computer 14, an application server 16, and a Card Management (CM) system 18. The mobile device 12 has a mobile device identifier and is associated with a user. A plurality of mobile devices 12, each having a different mobile device identifier and being associated with a same or different user, may alternatively be included in the security system 10.

The mobile device 12 is a smart phone that at least stores data and applications therein, executes applications, displays text and images, captures authentication data from users, and performs matching of any feature or information associated with users to authenticate the identity of users. The mobile device 12 includes buttons or icons 20 for entering commands and invoking applications stored therein, and a display screen 22 such as, but not limited to, a Liquid Crystal Display (LCD) that displays text and images. Moreover, the mobile device 12 may include cameras (not shown) and a microphone (not shown). The mobile device 12 may store any data therein including, but not limited to, a mobile device smart card identifier, authentication data, and biographic data.

Authentication data is any data that may be used to authenticate the identity of users. Authentication data may include, but is not limited to, public-private key pairs, personal identification numbers (PINs), usernames, passwords, and biometric data. Biometric data may correspond to any biometric modality desired to be used for verifying the identity of a user during an authentication transaction. Such biometric modalities include, but are not limited to, face, finger, iris, voice and palm, and any combination of face, finger, iris, voice and palm. Biographic data includes any demographic information regarding a user including, but not limited to, a user's name, age, date of birth, address, citizenship and marital status. Authentication data may also include derivations of captured authentication data. For example, authentication data may also include, but is not limited to, biometric templates and hashes. The biometric templates are derived from captured biometric data. The hashes are derived from information such as, but not limited to, PINS, usernames, and passwords.

The mobile device 12 associates the mobile device smart card identifier with the authentication data and biographic data of the user associated with the mobile device 12, and stores the mobile device smart card identifier, authentication data, and biographic data of each user in a different data record. Certificates generated by Certificate Authorities, digitally signed trust point public keys, and a status of the mobile device 12 may also be stored in the data record. The status may indicate whether or not the CM system 18 has activated the mobile device 12 associated with a certain mobile device smart card identifier.

Although the mobile device 12 is a smart phone, the mobile device 12 may alternatively be any device capable of at least storing applications and data, executing applications, displaying at least one of text and images, capturing and transmitting data, and conducting authentication transactions. Such other devices include, but are not limited to, a portable cellular phone, a tablet computer, a laptop computer, and any type of portable communications device having wireless capabilities such as a personal digital assistant (PDA).

The mobile device 12 is configured to communicate with the computer 14 using a secure wireless communications protocol such as, but not limited to, Bluetooth and Near Field Communications (NFC). Moreover, the mobile device 12 is configured to communicate over a network 24 with the application server 16, the CM system 18, other devices (not shown) and systems (not shown), and to at least conduct telephone calls and access the Internet over the network 24.

The communications network 24 is a 4 G communications network. Alternatively, the communications network 24 may be any wireless network including, but not limited to, 3G, Wi-Fi, Global System for Mobile (GSM), Enhanced Data for GSM Evolution (EDGE), and any combination of a local area network (LAN), a wide area network (WAN) and the Internet. The network 24 may also be any type of wired network.

The applications stored in the mobile device 12 cause it to perform at least the functions described herein. For example, a Smart Card Emulation (SCE) application may be stored in and cause the mobile device 12 to at least execute commands originating from the CM system 18, and to execute security algorithms typically executed on smart cards such as, but not limited to, elliptic-curve asymmetric key cryptography and symmetric key cryptography. Executing such security algorithms facilitates establishing secure communications between the mobile device 12 and the CM system 18 before information is exchanged there between, facilitates ensuring that information or commands originated at and were transmitted from the CM system 18 in an unaltered sequence to the mobile device 12, and facilitates decrypting encrypted data received at the mobile device 12 that originated at the CM system 18.

The SCE application may also cause the mobile device 12 to emulate operations conducted by smart cards as well as by smart card readers containing smart cards as implemented in contemporary smart card security systems. Such operations are referred to herein as smart card transactions. Smart card transactions include, but are not limited to, causing the mobile device 12 to select an application stored therein for execution, obtain the mobile device smart card identifier, write data related to a user onto the mobile device 12, authenticate the user, read user data from the mobile device 12, generate and apply symmetric keys to encrypt and decrypt data, and generate and apply private keys to digitally sign documents or decrypt data.

Although the SCE application causes the mobile device 12 to emulate smart card transactions conducted by smart cards and smart card readers containing smart cards, it should be understood that smart card transactions conducted by each mobile device 12 are generally different because each mobile device 12 generally has different data stored therein and has different operating characteristics.

The SCE application causes the mobile device 12 to emulate smart card transactions conducted by one smart card, associated with an authorized user, in a smart card reader. However, the SCE application may alternatively cause the mobile device 12 to emulate smart card transactions conducted by different smart cards, of the same or different users, in a smart card reader. Moreover, each mobile device 12 may store and execute any number of different SCE applications that each causes the device 12 to emulate smart card transactions substantially similar to a different smart card in a smart card reader.

The SCE application includes an SCE identifier and causes the mobile device 12 to combine the SCE identifier with the mobile device identifier to create the mobile device smart card identifier and to store the mobile device smart card identifier therein. Because the mobile device identifier of each mobile device 12 is different, the mobile device smart card identifier for each device 12 is also different. The mobile device smart card identifier is used to identify a mobile device 12 that emulates smart card transactions.

The computer 14 is a personal computer including devices, such as, but not limited to, a CD-ROM drive for reading data from computer-readable recording mediums, such as a compact disc-read only memory (CD-ROM), a magneto-optical disc (MOD) and a digital versatile disc (DVD). Moreover, the computer 14 may include a display device, such as, but not limited to, a liquid crystal display (LCD), a cathode ray tube (CRT) and other display monitors. Furthermore, the computer 14 may include a printer and input devices such as, but not limited to, a mouse (not shown), keypad (not shown), a keyboard, a camera (not shown), a microphone (not shown), and any type of biometric capture device (not shown).

The computer 14 may be configured to capture biometric data and to communicate with the application server 16, the CM system 18, other devices (not shown) and systems (not shown) over the network 24, and communicate with the mobile device 12 using a secure wireless communications protocol such as, but not limited to, Bluetooth and NFC. The computer 14 monitors for mobile devices 12 using the secure wireless communications protocol. Mobile devices 12 within the operating range of the secure wireless communications protocol are considered to be proximate the computer. When a mobile device 12 moves out of the operating range of the secure wireless communications protocol, it is no longer proximate the computer 14. As a result, the computer 14 automatically ceases communicating with detected mobile devices 12 that move out of operating range.

The computer 14 stores data and applications therein. For example, the computer 14 may store at least a Smart Card Resource Manager (SCRM) application and a Smart Card Mobile Device Interface (SCMDI) application. The SCRM application causes the computer 14 to automatically detect the presence of and communicate with mobile devices 12 proximate thereto, query properties of detected mobile devices 12, and query the status of detected mobile devices 12. Furthermore, the SCRM application may cause the computer 14 to communicate with and cease communicating with detected mobile devices 12, as well as to transmit commands to mobile devices 12 for execution thereon. The computer 14 detects the SCE application within the mobile device 12 without regard to whether the SCE application has been initialized. However, when the SCE application has not been initialized the mobile device 12 cannot conduct smart card transactions.

The SCMDI application together with the SCE application cause the computer 14 and the mobile device 12 to communicate such that the computer 14 recognizes communications from the mobile device 12 as communications from a smart card reader containing a smart card. The computer 14 may also include a browser-based application that causes the computer 14 to communicate with mobile devices 12 on which the SCE application has been installed and initialized. Although the computer 14 is a personal computer in the exemplary security system 10, the computer 14 may alternatively be any computing device capable of conducting smart card transactions such as, but not limited to, a security device positioned at or installed at the entrance to a building or room within a building, a tablet computer, a smart phone, and a laptop computer. Although the security system 10 includes a single computer 14, the security system 10 may alternatively include a plurality of computers 14.

The application server 16 includes components such as, but not limited to, a web server and a disk storage unit. The disk storage unit may store any kind of data such as, but not limited to, applications, authentication data, personal data, unique user identifiers, and trust point public keys digitally signed by Certificate Authorities. Applications stored in the application server 16 include, but are not limited to, the SCE and SCMDI applications. Moreover, the application server 16 is configured to communicate with the mobile device 12, the computer 14, the CM system 18, and other devices (not shown) and systems (not shown) over the network 24.

The CM system 18 includes components such as, but not limited to, a database server and a disk storage unit that may be used to store any kind of data. The CM system 18 stores data of different authorized users in different respective data records. The data records may include any data specified by the CM system 18 to be obtained from authorized users during enrollment therein and subsequent to enrollment. For example, each of the CM system data records may store data including, but not limited to, the name of an authorized user, the mobile device smart card identifier of a mobile device 12 associated with the user, and the status of the mobile device 12 as activated or not activated. The data records stored in the CM system 18 are referred to herein as enrollment data records.

The CM system 18 is configured to communicate with the mobile device 12, the computer 14, and the application server 16 over the network 24. The CM system 18 performs functions such as, but not limited to, generating and transmitting information and commands to the mobile device 12. The commands include, but are not limited to, commands for initializing the SCE application on the mobile device 12 and for personalizing information stored on the mobile device 12. As a result of executing commands and storing information transmitted from the CM system 18, the mobile device 12 includes information substantially similar to that included in a personalized smart card. A personalized smart card is a smart card that includes information about the card holder including, but not limited to, personal data, biometric data, and any other operational data. It should be understood that the information and commands are encrypted such that only a specific mobile device 12 identified by the CM system 18 may decrypt the information and commands.

Although the application server 16 and the CM system 18 are separate systems in the exemplary security system 10, the application server 16 and the CM system 18 may alternatively be included together in a same system.

The mobile device 12, the computer 14, the application server 16, and the CM system 18, respectively, each include a processor (not shown) and a memory (not shown). It should be understood that, as used herein, the term processor is not limited to just those integrated circuits referred to in the art as a processor, but broadly refers to a computer, an application specific integrated circuit, and any other programmable circuit. It should be understood that the processors execute instructions, or computer programs, stored in the respective memories (not shown) of the mobile device 12, the computer 14, the application server 16, and the CM system 18. The above examples are exemplary only, and are thus not intended to limit in any way the definition and/or meaning of the term "processor."

The respective memories (not shown) in the mobile device 12, the computer 14, the application server 16, and the CM system 18, can be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like.

Each of the memories (not shown) can be a computer-readable recording medium used to store data, respectively, in the mobile device 12, the computer 14, the application server 16, and the CM system 18. Moreover, each of the respective memories (not shown) can be a computer-readable recording medium used to store computer programs or executable instructions that are executed, respectively, by the mobile device 12, the computer 14, the application server 16, and the CM system 18. Furthermore, the memories (not shown) may include smart cards, SIMs or any other medium from which a computing device can read computer programs or executable instructions. As used herein, the terms "computer program" and "application" are intended to encompass an executable program that exists permanently or temporarily on any computer-readable recordable medium that causes the computer or computer processor to execute the program and thus causes the computer to perform a function.

Figure 2:
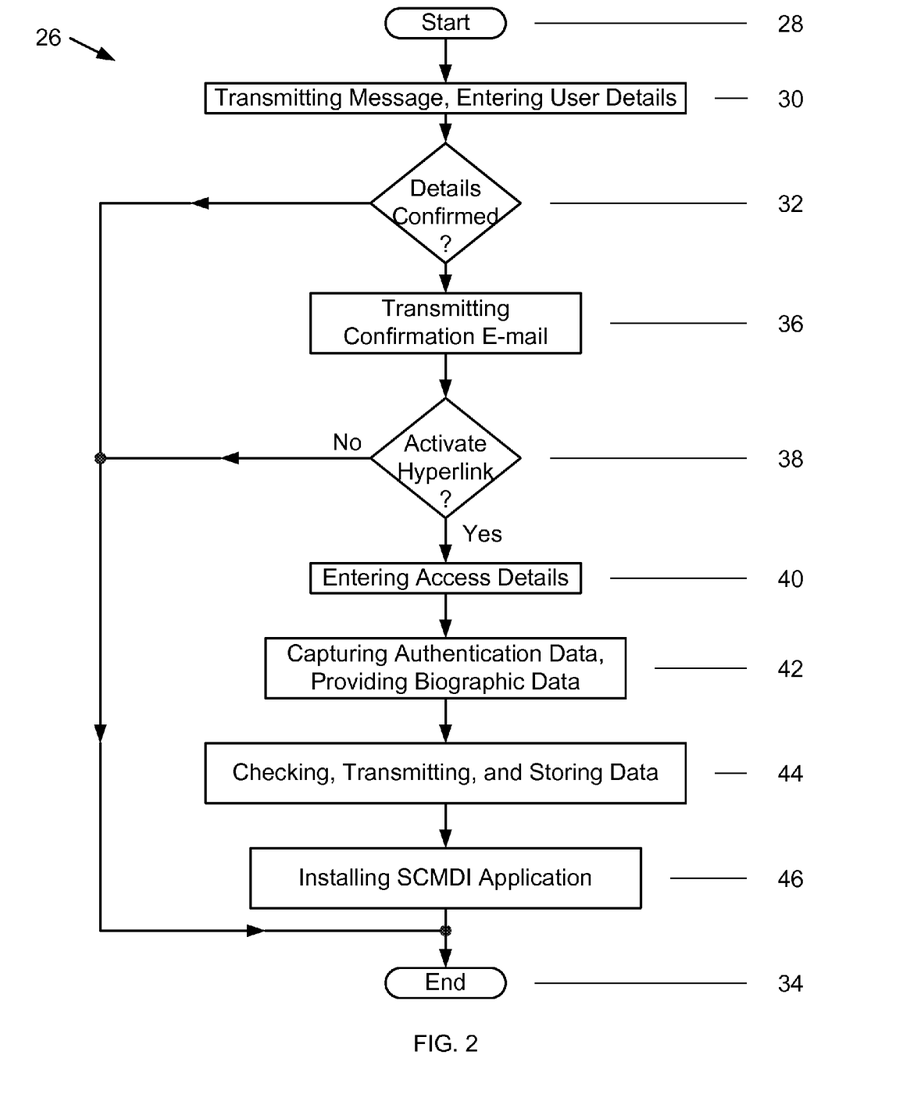
FIG. 2 is a flowchart illustrating an exemplary process for enrolling authorized users in a smart card management system.

FIG. 2 is a flowchart 26 illustrating an exemplary process used by the security system 10 for enrolling authorized users in the CM system 18 and downloading the SCMDI application to the computer 14. The process starts 28 when an authorized user decides to use his mobile device 12 when conducting smart card transactions, instead of using a smart card reader and a smart card. After deciding to use the mobile device 12, the user operates the computer 14 to initiate communications with the application server 16. The application server 16 continues by transmitting a message 30 to the computer 14 requesting details about the user such as, but not limited to, a username, a password, and an e-mail address. After reading the requested details from the computer 14, the user continues by entering details 30 in accordance with the request. Next, the computer 14 continues by transmitting the entered details to the application server 16 which continues by confirming that the entered password satisfies criteria of the security system 10 and confirming that the entered e-mail address is in an acceptable format. When the details are not confirmed 32, processing ends 34. However, when the details are confirmed 32, the application server 16 continues processing by generating a confirmation e-mail message, and transmitting the confirmation e-mail message 36 to the e-mail address included in the entered details. The confirmation e-mail message includes an embedded hyperlink which when activated allows the user to access the application server 16 and to enroll in the CM system 18. Clicking on the hyperlink activates the link.

After receiving the confirmation e-mail message, the computer 14 continues by displaying a message prompting the user to read the received confirmation e-mail message and to activate the hyperlink embedded therein. If the user does not access the confirmation e-mail message and activate the hyperlink 38, processing ends 34. However, if the user continues by opening the confirmation e-mail message and activating the embedded hyperlink 38, the computer 14 continues by displaying a message notifying the user that the entered details were confirmed and presenting access details to be provided by the user in order to access the application server 16. However, if the user does not activate the hyperlink 38, processing ends 40.

Next, the user continues by entering the access details 40 into the computer 14 which transmits the access details to the application server 16. After receiving the access details, the application server 16 continues by transmitting a message to the computer 14 requesting biographic and authentication data of the user as well as the mobile device smart card identifier associated with the mobile device 12 of the user. The biographic data includes, but is not limited to, the name, address, and employer of the user. The authentication data is fingerprint biometric data of the user. However, in alternative processes the biographic data may include different biographic data and the authentication data may include different biometric data of the user. After reading the requested data from the computer 14, the user continues by capturing authentication data and biographic data 42 in accordance with the request. Next, the computer 14 continues by transmitting the captured authentication data, the provided biographic data, and the mobile device smart card identifier to the application server 16. In response, the application server 16 continues by checking the received data 44 and transmitting the received data 44 to the CM system 18. The application server 16 may check the received data for at least invalid characters and improper formatting, and check that the length of the received data does not exceed an allowed maximum or fall below a minimum.

The CM system 18 continues processing by generating a unique user identifier for the user and storing 44 the received biographic data, authentication data, and mobile device smart card identifier with the unique user identifier in an enrollment data record created for the user. The biographic and authentication data, the mobile device smart card identifier, and unique user identifier of each respective user, as stored in the CM system 18, are associated with each other.

Next, the CM system 18 continues by transmitting the generated unique user identifier to the application server 16 for storage therein as well as a message notifying the application server 16 that enrollment of the user is complete. Next, the application server 16 continues by generating and transmitting an installation e-mail message including an embedded hyperlink to the e-mail address of the user. The user accesses the installation e-mail message at any time convenient for the user and activates the hyperlink by clicking it. After activating the hyperlink, the application server 16 continues by transmitting the SCMDI application to the computer 14 which continues processing by installing 46 the SCMDI application thereon. Next, processing ends 34.

Although the hyperlink is included in the installation e-mail message in the exemplary enrollment process, it should be understood that the hyperlink may alternatively be included in any e-mail message or communication, transmitted to the user from the application server 16, after enrollment is completed. The hyperlink embedded in the installation e-mail is different than the hyperlink embedded in the confirmation e-mail message.

Figure 3:
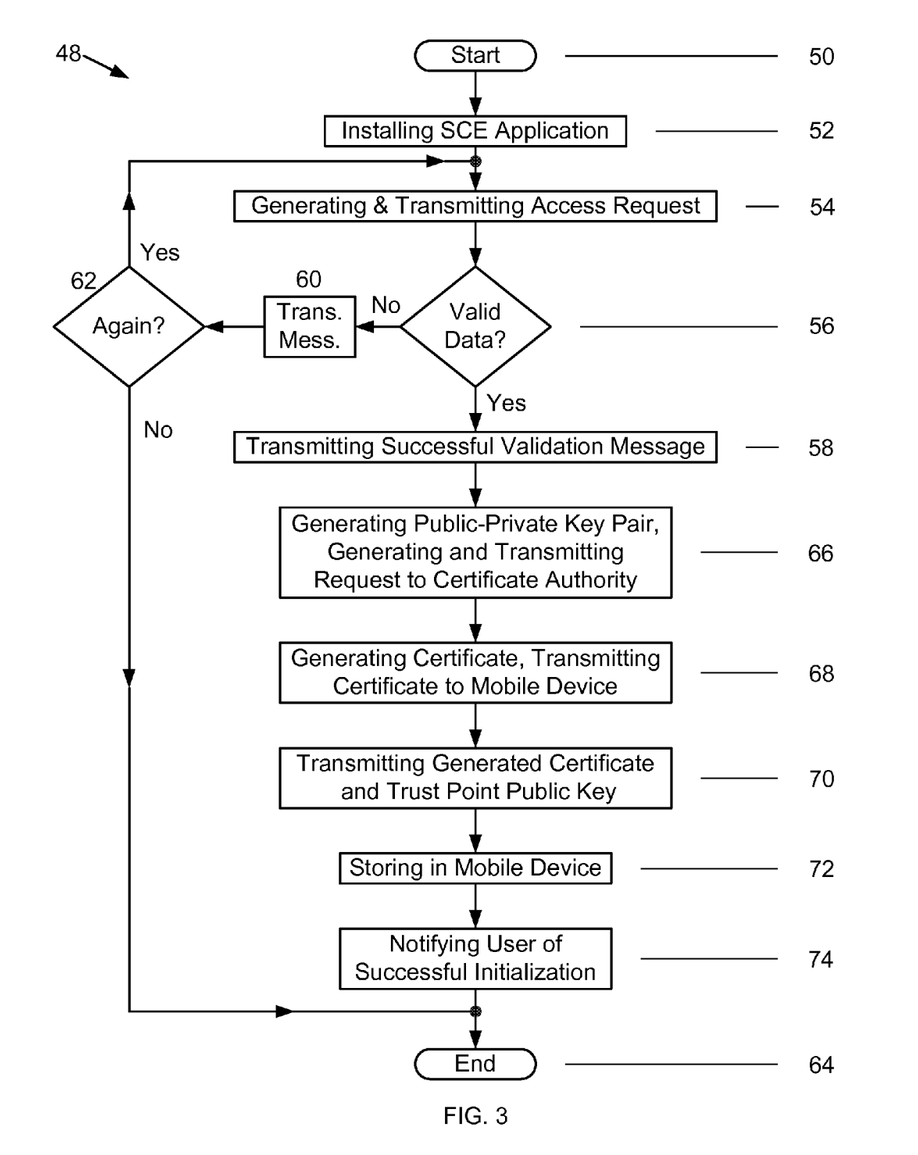
FIG. 3 is a flowchart illustrating an exemplary process for initializing a smart card emulation application stored on a mobile device.

FIG. 3 is a flowchart 48 illustrating an exemplary process used by the security system 10 for initializing the SCE application in the mobile device 12. The process starts 50 when an authorized user operating the mobile device 12 installs the SCE application 52 thereon. After installing the SCE application 52, the user continues by capturing authentication data with the mobile device 12. Next, the mobile device 12 continues by generating and transmitting an access request message 54 to the application server 16. The access request message includes the captured authentication data, which is the username and password of the user, and requests access to the application server 16. The authentication data may alternatively be any other authentication data that facilitates authenticating the user to the application server 16. Next, the application server 16 continues by determining whether the received authentication data is valid 56.

When the received authentication data matches authentication data stored therein, the received authentication data is deemed valid 56 and the application server 16 continues by transmitting a successful validation message 58 including a digitally signed trust point public key to the mobile device 12. The mobile device 12 stores the digitally signed trust point public key therein. Otherwise, the application server 16 continues by transmitting a message 60 to the mobile device 12 notifying the user of the unsuccessful validation and inviting the user to try accessing the application server 16 again 62. When the user decides to try again 62, the user continues by capturing his authentication data with the mobile device 12 which continues by generating and transmitting another access request message 54 to the application server 16. The application server 16 determines whether the received authentication data is valid 56. Otherwise, processing ends 64. In this exemplary initialization process, the user may try authenticating a maximum of three times. However, in alternative processes users may try any number of times.

After receiving the successful validation message, the mobile device 12 continues by generating a public-private key pair 66, and generating and transmitting 66 a certification generation request to a Certificate Authority. The certification generation request includes the generated public key and requests that the Certificate Authority digitally sign the generated public key with its private key. The generated public key signed with the private key of the Certificate Authority constitutes a generated certificate. Next, the Certificate Authority continues by generating a certificate 68 by signing the generated public key with its private key and transmitting 68 the generated certificate to the mobile device 12. By virtue of storing 72 the generated certificate in the mobile device 12, the SCE application is successfully initialized and the mobile device 12 is activated. After successfully initializing the SCE application, the mobile device 12 continues by transmitting a message to the computer 14 notifying the user 74 that the SCE application has been successfully initialized and processing ends 64.

As a result of initializing the SCE application, the SCE application is enabled to facilitate establishing secure communications between the mobile device 12 and the CM system 18 regardless of the communications path. More specifically, the SCE application is enabled to facilitate conducting a mutual authentication process between the mobile device 12 and the CM system 18 by causing the mobile device 12 to authenticate the CM system 18 and causing the mobile device 12 to emulate operations conducted by smart cards for authentication by the CM system 18. After each authentication has been successfully conducted, communications between the CM system 18 and the mobile device 12 are deemed secure. Secure communications are established over any communications path using key-based security techniques that include symmetric key cryptography and public key infrastructure (PKI). However, in alternative processes any type of security technique may be used that facilitates establishing secure communications between the mobile device 12 and the CM system 18 regardless of the communications path. All communications between the mobile device 12 and the CM system 18, regardless of the communications path, are required to be secure communications. Moreover, it should be understood that communications between the mobile device 12 and the CM system 18 as described herein may pass through intermediate devices or systems.

Figure 4:
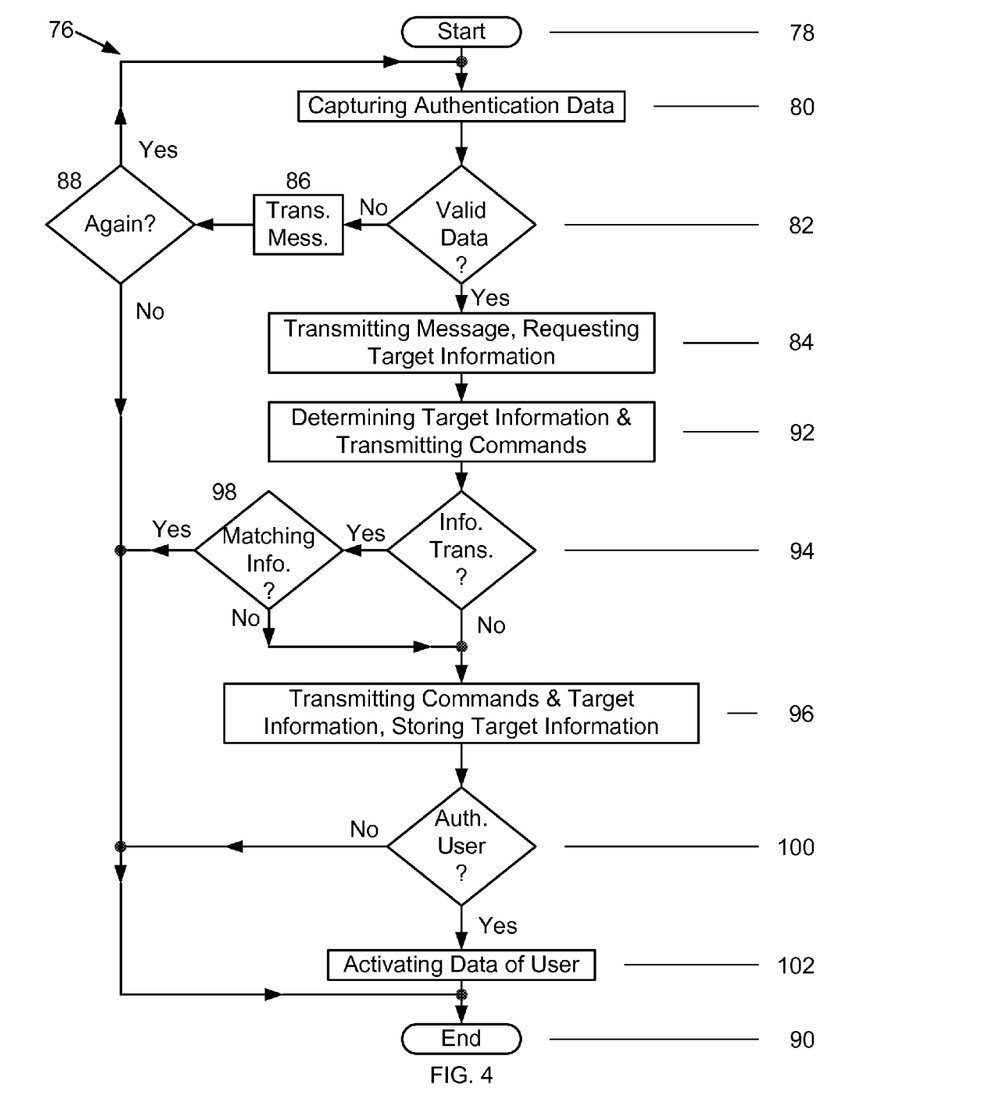
FIG. 4 is a flowchart illustrating an exemplary process for installing target information on a mobile device.

FIG. 4 is a flowchart 76 illustrating an exemplary process used by the security system 10 for installing target information on a mobile device 12. The process starts 78 when a user operating the computer 14 captures authentication data 80 required for accessing the application server 16. The authentication data is a username and password. However, the authentication data may be any other data that facilitates authenticating the user to the application server 16. Next, the computer 14 continues by transmitting the captured authentication data to the application server 16 which continues by determining whether the received authentication data is valid 82.

When the received authentication data matches authentication data stored therein, the received authentication data is deemed valid 82 and the application server 16 continues by transmitting a successful validation message 84 to the computer 14. Otherwise, the application server 16 continues by transmitting a message 86 to the computer 14 notifying the user of the unsuccessful validation and inviting the user to try accessing the application server 16 again 88. When the user decides to try again 88, the user continues by capturing the required authentication data. Next, the computer 14 continues by transmitting the captured authentication data to the application server 16 which determines whether the captured authentication data is valid 82. Otherwise, when the user does not try again 88, processing ends 90. In this exemplary installation process, the user may try authenticating a maximum of three times. However, in alternative installation processes users may try any number of times.

After receiving the successful validation message, the computer 14 continues by displaying a message prompting the user to request that target information 84 be transmitted to the mobile device 12 of the user from the CM system 18. Target information is any information or data that may be used to cause or facilitate causing the mobile device 12 to conduct smart card transactions. Target information includes, but is not limited to, enrollment data of the user, applications, commands, instructions, data generated by the CM system 18, and data generated by the CM system 18 and the mobile device 12 during communications there between. Because there are many different types of smart cards, target information corresponding to different smart cards may be stored in the CM system 18.

Next, the user causes the computer 14 to continue processing by generating a message requesting target information and transmitting the request message to the application server 16. The application server 16 is configured to determine the type of smart card from the request message. Thus, the application server 16 continues processing by determining the type of smart card corresponding to the request message, determining the unique user identifier of the requesting user, and generating and transmitting a subsequent request message to the CM system 18. The subsequent request message includes at least the determined type of smart card and unique user identifier. After receiving the subsequent request message, the CM system 18 continues by determining the target information 92 stored therein corresponding to the type of smart card and transmitting commands 92 to the mobile device 12, for obtaining the mobile device smart card identifier therefrom. Next, the mobile device 12 continues processing by executing the commands and transmitting the mobile device smart card identifier to the CM system 18.

The CM system 18 continues processing by determining 94 whether or not target information was transmitted to a mobile device 12 having a mobile device smart card identifier matching the received mobile device smart card identifier. More specifically, the CM system 18 continues by comparing the received mobile device smart card identifier against mobile device smart card identifiers stored therein. When the received mobile device smart card identifier does not match one stored in the CM system 18, target information was not previously transmitted 92 to the mobile device 12 of the user. Consequently, the CM system 18 continues processing by transmitting 96 additional commands and the determined target information to the mobile device 12. As the commands and target information are received from the CM system 18, the mobile device 12 continues by executing the received commands and storing 96 the received target information in a data record created for the user.

A match between the received mobile device smart card identifier and one stored in the CM system 18 indicates that target information was previously transmitted 94 to the mobile device 12. Consequently, the CM system 18 continues processing by determining whether or not the previously transmitted target information matches 98 the determined target information. If so, processing ends 90. Otherwise, the CM system 18 continues processing by transmitting 96 additional commands and the determined target information to the mobile device 12.

Next, processing continues by authenticating 100 the user. More specifically, the application server 16 continues by transmitting a message to the computer 14 requesting the user to capture authentication data. In this exemplary process the authentication data is the PIN of the user. However, in alternative processes the authentication data may be any authentication data such as, but not limited to, biometric data, usernames and passwords. The user continues by capturing authentication data in accordance with the message at the computer 14. Next, the computer 14 continues by transmitting the captured authentication data to the mobile device 12. The mobile device 12 continues processing by comparing the received authentication data against corresponding authentication data of the user stored therein, and identifying the user as the bona fide owner 100 of the mobile device 12 when the received and stored authentication data match. Otherwise, processing ends 90.

After identifying the user as the bona fide owner 100, the mobile device 12 continues by transmitting a successful authentication message to the application server 16 which continues by transmitting a message to the CM system 18 requesting activation of the enrollment data record of the user 102. The CM system 18 continues by activating 102 the enrollment data record of the user. The CM system 16 may activate the enrollment data record of the user in any manner including, but not limited to, conducting a series of communications with the mobile device 12. After the enrollment data record is activated 102, the mobile device 12 may be used to conduct smart card transactions instead of actual smart card readers and smart cards. Next, processing ends 90.

Individuals are generally more mindful of their personal mobile devices than of smart cards issued to them by corporate or governmental entities. As a result, it is less likely that users will misplace their personal mobile devices versus smart cards, and as a consequence less likely that imposters will obtain and surreptitiously use misplaced mobile devices. Thus, by virtue of substituting mobile devices capable of conducting smart card transactions, the costs of conducting smart card based authentication transactions are facilitated to be reduced, the costs of maintaining smart card based security systems are facilitated to be reduced, and the risks that imposters will obtain unauthorized access to confidential data and communications is facilitated to be reduced. Moreover, harmful effects that non-biodegradable smart cards have on the environment are facilitated to be reduced.

Figure 5:
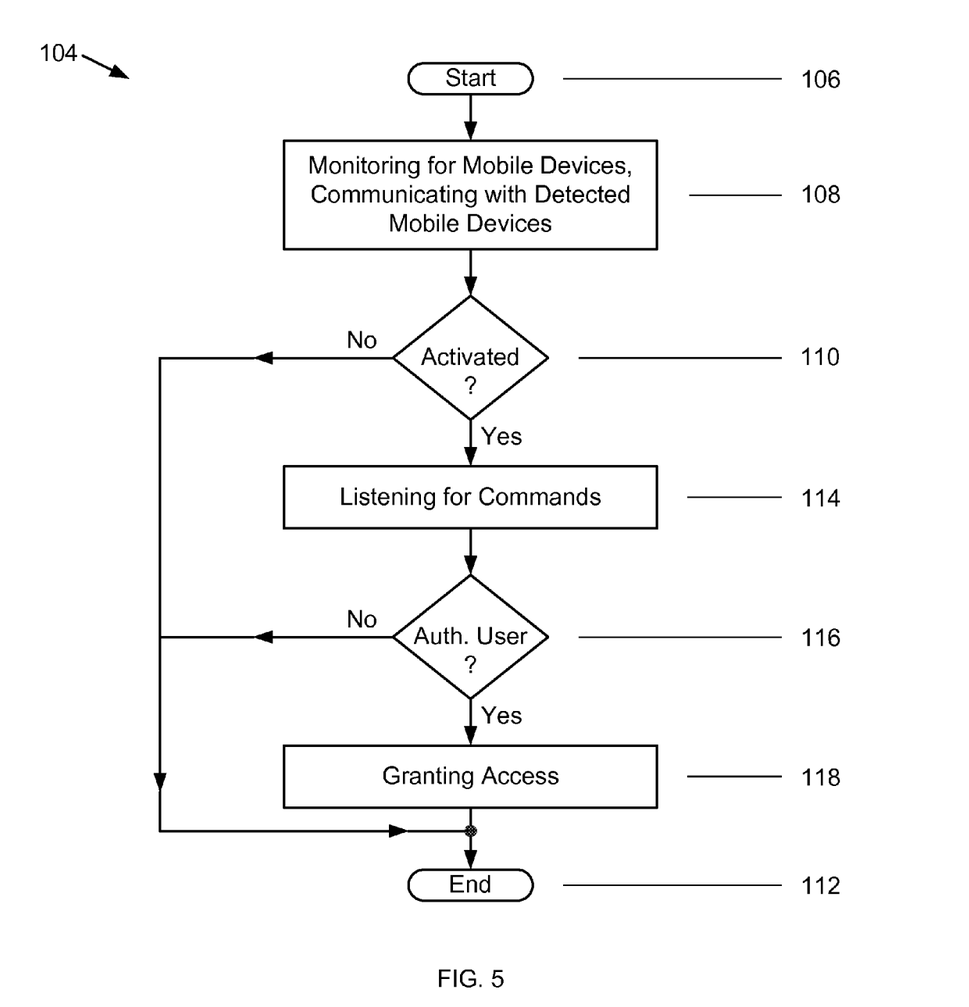
FIG. 5 is a flowchart illustrating an exemplary process of conducting a smart card transaction with a mobile device.

FIG. 5 is a flowchart 104 for illustrating an exemplary process of conducting a smart card transaction with the mobile device 12. The smart card transaction is an authentication transaction. For the security system 10, the process starts 106 with the computer 14 continuously monitoring 108 for the presence of mobile devices 12 enrolled in the CM system 18. When a mobile device 12 enrolled in the CM system 18 is proximate the computer 14, the computer 14 continues by automatically detecting the mobile device 12 and communicating 108 with the detected mobile device 12 to determine whether the status of the detected mobile device 12 is activated or not 110. If not activated 110, the computer 14 continues by ceasing communications with the detected mobile device 12 and processing ends 112. However, when the detected mobile device 12 has been activated 110, the computer 14 continues by maintaining communications with the detected mobile device 12 and registering therein that a smart card reader containing a smart card is available for use by the computer 14. The detected mobile device 12 continues by listening for commands 114 from the computer 14.

When the user operates the computer 14 to navigate over the Internet to access a website requiring successful authentication in accordance with smart card security techniques before granting access, the computer 14 continues by communicating with the detected mobile device 12 in order to authenticate the user. As a result of communicating with the detected mobile device 12, the computer 14 determines an authentication data requirement and continues by prompting the user for authentication data complying with the authentication data requirement. Next, the user continues by capturing authentication data complying with the requirement using the detected mobile device 12. The detected mobile device 12 continues by comparing 116 the captured authentication data against corresponding authentication data of the user stored therein. The user is successfully authenticated when the captured authentication data matches the stored authentication data. Upon successful authentication 116, processing continues by granting the user access 118 to the website and then processing ends 112. However, when the user is not successfully authenticated 116 the user is not granted access to the website and processing ends 112.

Although the computer 14 communicates with the mobile device 12 to determine the authentication requirement in the exemplary smart card transaction, the authentication requirement may alternatively be determined in any manner. For example, the website may determine the authentication requirement.

Although the exemplary process for conducting a smart card transaction involves detecting a mobile device 12 with the computer 14, authenticating the user, and obtaining access to a website, in alternative processes the computer 14 may be any type of computing device that is capable of detecting mobile devices 12 and that facilitates conducting smart card transactions. For example, the computer 14 may alternatively be a computing device mounted on a wall next to a door that detects mobile devices 12, and that facilitates authenticating users of detected mobile devices 12 in accordance with smart card security techniques before permitting users to enter through the door.

The exemplary smart card transaction process described herein requires authentication of the user by comparing authentication data captured from the user against stored corresponding authentication data of the user. In alternative processes, after successfully authenticating the user, the user may be permitted to conduct additional similar or different smart card transactions for a set period of time after the successful authentication. The set period of time may be of any duration, for example, twenty minutes. In other alternative processes instead of comparing captured and stored authentication data, possession of the mobile device 12 continuously for a set period of time may be adequate to authenticate a user. The set period of continuous time may be of any duration, for example, two hours. In yet other alternative processes instead of comparing captured and stored authentication data, mere possession of the mobile device 12 may be adequate to authenticate a user.

The above-described methods for conducting smart card transactions on mobile devices facilitate reducing smart card based transaction costs and risks. More specifically, a smart card mobile device interface application installed on a computer and a smart card emulation application installed on mobile devices together cause the computer to recognize communications from each of the mobile devices as communications from a smart card reader containing a smart card. After enrollment data of a user is activated in a card management system, the mobile devices and computer may automatically communicate to conduct smart card transactions in accordance with smart card security techniques. As a result, the costs of conducting smart card transactions and of maintaining smart card security systems, as well as the risks that imposters will obtain unauthorized access to confidential data and communications, is facilitated to be reduced. Moreover, harm to the environment caused by non-biodegradable smart cards is facilitated to be reduced.

Exemplary embodiments of systems and processes for decreasing the costs of conducting smart card transactions and reducing the risks that imposters will gain access to confidential data and communications are described above in detail. The processes are not limited to use with the specific computer system embodiments described herein, but rather, the processes can be utilized independently and separately from other processes described herein. Moreover, the invention is not limited to the embodiments of the systems and processes described above in detail. Rather, other variations of the processes may be utilized within the spirit and scope of the claims.

While the invention has been described in terms of various specific embodiments, those skilled in the art will recognize that the invention can be practiced with modification within the spirit and scope of the claims.

What is claimed is:

1. A method for conducting smart card transactions comprising:
   determining, by a card management system, target information corresponding to a smart card type and transmitting commands to a user mobile device, the card management system being configured to store therein target information for different smart card types;
   transmitting a smart card identifier for the user mobile device to the card management system and comparing the received identifier against mobile device smart cart identifiers stored therein;
   transmitting target information to, and storing in, the user mobile device when the received and stored identifiers do not match;
   transmitting, by a computer, biometric data captured from the user to the user mobile device;
   after successfully authenticating the user with the user mobile device based on the captured data, activating, by the card management system, an enrollment data record of the user stored therein;
   monitoring, by the computer, for mobile devices enrolled in the card management system, the user mobile device being included in the monitored mobile devices;
   recognizing, by the computer, communications from a detected mobile device as communications from a smart card reader containing a smart card;
   determining whether the detected mobile device is activated;
   when the detected mobile device is activated, authenticating the user by comparing authentication data captured from the user against user authentication data stored in the mobile device; and
   granting access to a resource, access being contingent upon successful authentication using smart card security techniques.

2. The method for conducting smart card transactions in accordance with claim 1, further comprising:
   installing, before said monitoring step, an interface application on the computer; and
   installing, before said monitoring step, an emulation application on the detected mobile device and initializing the emulation application.

3. The method for conducting smart card transactions in accordance with claim 2, said initializing step further comprising:
   transmitting a certificate and a digitally signed trust point public key from an application server to the detected mobile device; and
   storing the certificate and digitally signed trust point public key in the mobile device.

4. A method for conducting smart card transactions in accordance with claim 1, further comprising storing in the card management system data of different authorized users in different respective data records.

5. The method for conducting smart card transactions in accordance with claim 3, further comprising:
   generating a public-private key pair at the detected mobile device; and
   generating the certificate at a certificate authority and transmitting the certificate to the detected mobile device.

6. A system for conducting smart card transactions comprising:
   a computer;
   a card management system; and
   at least one mobile device, wherein:
   said computer, said card management system, and said at least one mobile device are configured to communicate with each other;
   said computer is configured to
   capture biometric data from users,
   transmit biometric data captured from a user to a user mobile device, the user mobile device being associated with the user and being included in said at least one mobile device,
   monitor for mobile devices enrolled in said card management system, the monitored mobile devices being included in said at least one mobile device,
   recognize communications from said at least one mobile device as
   communications from a smart card reader containing a smart card and determine whether a recognized mobile device is activated, the recognized mobile devices being configured to conduct a smart card transaction in accordance with smart card security techniques, and
   access a website after the user is successfully authenticated;
   said card management system is configured to
   determine target information corresponding to a smart card type,
   transmit commands to said at least one mobile device,
   store target information for different smart card types,
   compare smart card identifiers received from said at least one mobile device against mobile device smart card identifiers stored therein,
   transmit target information to said at least one mobile device when the received and stored identifiers do not match, and
   activate an enrollment data record of the user stored therein after the user is successfully authenticated; and
   said at least one mobile device is configured to
   capture authentication data from users when said at least one mobile device is activated, and
   compare the captured authentication data against user authentication data stored therein.

7. The system for conducting smart card transactions in accordance with claim 6, said at least one mobile device being further configured to conduct operations conducted by smart card readers containing smart cards.

8. The system for conducting smart card transactions in accordance with claim 6, said computer being further configured to:
   determine that a recognized mobile device is proximate thereto when the recognized mobile device is within operating range of a communications protocol of said computer; and
   cease communicating with the recognized mobile device when the recognized mobile device is out of the operating range.

9. The system for conducting smart card transactions in accordance with claim 6, said at least one mobile device being further configured to:
   execute security algorithms used on smart cards; and
   generate and apply private keys to digitally sign documents and decrypt data.

10. A mobile communications device for emulating smart card readers containing smart cards comprising a processor and a memory, said memory being configured to store data, said communications device being associated with a network and said memory being coupled to said processor and having instructions stored therein which, when executed by said processor cause said processor to perform operations comprising:

receiving commands transmitted from a card management system, the card management system being configured to determine target information corresponding to a smart card type and store target information for different smart card types;

transmitting a smart card identifier for said communications device to the card management system, the card management system being further configured to compare the received identifier against mobile device smart card identifiers stored therein;

receiving, and storing in said memory, target information from said card management system when the received and stored identifiers do not match;

receiving biometric data captured from a user by a computer;

authenticating the user based on the received biometric data, wherein the card management system is further configured to activate an enrollment data record of the user stored therein after the user is successfully authenticated;

communicating with the computer such that the computer recognizes said mobile communications device as a smart card reader containing a smart card;

when the computer determines said mobile communications device is activated, comparing authentication data captured from the user against user authentication data stored in said memory; and transmitting a successful authentication result to the computer such that the user can be granted access to a desired website.

11. The mobile communications device in accordance with claim 10 said memory being configured to store authentication data and biographic data of a user associated with said mobile communications device, and store a mobile device smart card identifier.

12. The mobile communications device in accordance with claim 10, wherein the operations further comprise emulating operations conducted by smart cards and by smart card readers containing smart cards.

13. The mobile communications device in accordance with claim 10, said mobile device being a smart phone, a tablet computer, a laptop computer, or a personal digital assistant.

14. The method for conducting smart card transactions in accordance with claim 2, said recognizing step comprising causing, by the interface and emulation applications, the computer and the detected mobile device, respectively, to communicate such that the computer recognizes the detected mobile device as a smart card reader containing a smart card.

* * * * *